US007548971B2

(12) United States Patent
Espinoza-Ibarra et al.

(10) Patent No.: US 7,548,971 B2
(45) Date of Patent: Jun. 16, 2009

(54) SYSTEM AND METHOD FOR MANAGING THE OPERATING FREQUENCY OF BLADES IN A BLADED-SYSTEM

(75) Inventors: Ricardo Espinoza-Ibarra, Carmichael, CA (US); Andrew H. Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 10/216,229

(22) Filed: Aug. 12, 2002

(65) Prior Publication Data
US 2004/0030773 A1 Feb. 12, 2004

(51) Int. Cl.
*G06F 15/173* (2006.01)
*G06F 1/26* (2006.01)
*G06F 1/00* (2006.01)
(52) U.S. Cl. .................... 709/224; 713/320; 713/500
(58) Field of Classification Search ........... 713/300, 713/310, 320, 322, 323, 324, 340, 500; 709/223–225
See application file for complete search history.

(56) References Cited

U.S. PATENT DOCUMENTS

| 5,724,591 | A | | 3/1998 | Hara et al. | |
|---|---|---|---|---|---|
| 6,047,373 | A | * | 4/2000 | Hall et al. | 713/1 |
| 6,433,645 | B1 | * | 8/2002 | Mann et al. | 331/18 |
| 6,535,986 | B1 | * | 3/2003 | Rosno et al. | 713/400 |
| 6,785,827 | B2 | * | 8/2004 | Layton et al. | 713/300 |
| 6,795,928 | B2 | * | 9/2004 | Bradley et al. | 713/320 |
| 6,836,849 | B2 | * | 12/2004 | Brock et al. | 713/310 |
| 6,859,882 | B2 | * | 2/2005 | Fung | 713/300 |
| 6,901,522 | B2 | * | 5/2005 | Buch | 713/320 |
| 6,952,659 | B2 | * | 10/2005 | King et al. | 702/186 |
| 7,010,589 | B2 | * | 3/2006 | Ewing et al. | 709/223 |
| 7,185,214 | B2 | * | 2/2007 | Espinoza-Ibarra et al. | 713/320 |
| 2003/0048613 | A1 | * | 3/2003 | Garnett et al. | 361/724 |
| 2003/0120963 | A1 | | 6/2003 | Jahnke | |
| 2004/0003082 | A1 | * | 1/2004 | Abbondanzio et al. | 709/225 |
| 2004/0030774 | A1 | * | 2/2004 | Espinoza-Ibarra et al. | 709/224 |

FOREIGN PATENT DOCUMENTS

WO    WO 96/30832    10/1996

OTHER PUBLICATIONS

E. Elnozahy, M. Kistler, and R. Rajamony. Energy-efficient server clusters. In Proceedings of the Second Workshop on Power-Aware Computing Systems, Feb. 2, 2002 (held in conjunction with HPCA-2002).*
Search Report issued on Jan. 29, 2004 in counterpart foreign application in GB under application No. 3151110.7.
Sun Blade 100 Service Manual:- Functional Description—URL: http://docs.sun.com/source/805-4496-10/appC.htm—(c) Sun Microsystems Inc. 2000, see p. 34.

* cited by examiner

*Primary Examiner*—Jerry Dennison

(57) ABSTRACT

In a system and method for managing the performance of a bladed computer system, a management blade identifies one or more individual blades in a chassis. The management blade then automatically determines an optimal performance configuration for each of the individual blades and provides information about the determined optimal performance configuration for each of the individual blades to a service manager. Within the service manager, the information about the determined optimal performance configuration is processed and an individual frequency is set for at least one of the individual blades using the information processed within the service manager.

19 Claims, 4 Drawing Sheets

SYSTEM AND METHOD FOR MANAGING THE OPERATING FREQUENCY OF BLADES IN A BLADED-SYSTEM

CROSS-REFERENCE TO RELATED APPLICATIONS

This application is related to U.S. patent application Ser. No. 10/216,437, entitled "SYSTEM, METHOD AND APPARATUS FOR THE FREQUENCY MANAGEMENT OF BLADES IN A BLADED ARCHITECTURE BASED ON PERFORMANCE REQUIREMENTS" to Andrew H. BARR, et al.; U.S. patent application Ser. No. 10/216,438, U.S. patent application Ser. No. 10/216,283, entitled "MANAGING AN OPERATING FREQUENCY OF PROCESSORS IN A MULTI-PROCESSOR COMPUTER SYSTEM" to Ricardo ESPINOZA-IBARRA, et al.; U.S. patent application Ser. No. 10/216,234, entitled "SYSTEM AND METHOD FOR LOAD DEPENDENT FREQUENCY AND PERFORMANCE MODULATION IN BLADED SYSTEMS" to Ricardo ESPINOZA-IBARRA, et al.; U.S. patent application Ser. No. 10/216,284, entitled "VOLTAGE MANAGEMENT OF BLADES IN A BLADED ARCHITECTURE BASED ON PERFORMANCE REQUIREMENTS" to Andrew H. BARR, et al.; U.S. patent application Ser. No. 10/216,286, entitled "VOLTAGE MODULATION IN CONJUNCTION WITH PERFORMANCE OPTIMIZATION AT PROCESSOR LEVEL" to Andrew H. BARR, et al.; U.S. patent application Ser. No. 10/216,285, entitled "SYSTEM AND METHOD FOR MANAGING THE OPERATING FREQUENCY OF PROCESSORS OR BLADES" to Ricardo ESPINOZA-IBARRA, et al.; U.S. patent application Ser. No. 10/216,233, entitled "VOLTAGE MANAGEMENT OF PROCESSORS IN A BLADED SYSTEM BASED ON LOADING" to Andrew H. BARR, et al.; U.S. patent application Ser. No. 10/216,232, entitled "SYSTEM AND METHOD FOR VOLTAGE MANAGEMENT OF A PROCESSOR TO OPTIMIZE PERFORMANCE AND POWER DISSIPATION" to Andrew H. BARR, et al., and U.S. patent application Ser. No. 10/216,435, entitled "MANAGEMENT OF A MEMORY SUBSYSTEM" to Andrew H. BARR, et al., all of which are concurrently herewith being filed under separate covers, the subject matters of which are herein incorporated by reference.

BACKGROUND

Bladed servers, or bladed computer systems, are computing systems that provision servers or other computer resources on individual cards, or blades. There are many types of blades—server blades, storage blades, network blades, etc.—and one or more of each type of blade is typically hosted together in a single structure, thus creating high-density computing systems with modular architectures, ensuring flexibility and scalability of the systems, and reducing space requirements. Server blades, along with storage, networking, and other blades, are typically installed in a rack-mountable enclosure, or chassis, which hosts multiple blades. The multiple blades share common resources, such as cabling, power supplies, and cooling fans.

The telecommunications industry has been using blade server technology for many years. More generally, the condensed blade server architecture benefits people and businesses that: (1) use the Internet to generate revenue and to provide services to customers; (2) are moving some of their business processes to the Web; and/or (3) need the flexibility to deploy Internet-edge applications in their own data center. Because of recent developments in technology, blade servers are now used for applications such as Web hosting, Web caching, and content streaming.

In Web caching applications, frequently-requested Web content is stored closer to the user, thus allowing for quicker retrieval of objects by the user and reducing the time and bandwidth required to access the Internet. Since companies and individuals are now streaming media (e.g., video and audio) to more effectively communicate both internally and externally, a massive growth of rich media content delivery on the Internet has occurred. Bladed servers are being used to meet the new demands created as a result of this growth.

Though bladed servers provide many advantages, several engineering challenges arise when using bladed servers. Among these challenges is the challenge of designing and operating a bladed system such that sufficient heat is dissipated in the limited space available in the chassis that hosts the system. To address heat dissipation challenges, bladed server systems are designed within an underlying power and thermal envelope. For example, when a chassis that hosts a bladed system has a limited amount of airflow available to cool the blades (i.e., when the system can only dissipate a limited amount of heat), then the chassis is designed for a limited amount of power consumption and an associated limited performance of the blades. Some known power-limiting strategies include powering down a CPU functional unit, e.g., a floating-point unit or an on-die cache, or trading off speed for reduced power consumption in a hard drive.

Another way to address heat dissipation challenges includes having a customer purchase a completely new system each time the customer's needs change. However, completely new systems are financially and logistically burdensome for the customer. In addition, when addressing the challenges in this manner, the suppliers and distributors of the bladed systems are inconvenienced by having to stock systems with different feature sets (e.g., different processor speeds) and by having to dedicate more storage room, personnel, and paperwork to meeting the needs of customers.

SUMMARY

In one embodiment of a system and method for managing the performance of a bladed computer system, one or more individual blades in a chassis are identified using a management blade. Then, the management blade is then used to automatically determine an optimal performance configuration for each of the individual processors. Thereafter, information about the determined optimal performance configuration for each of the individual blades is provided to a service manager and the information about the determined optimal performance configuration is processed within the service manager. Finally, an individual frequency is set for at least one of the individual blades using the information processed within the service manager.

In an embodiment of a computer system, the computer system includes a set of processors housed within a chassis, a means for identifying an individual processor in the set of processors in the chassis, a means for automatically determining an optimal performance configuration for the individual processor, a means for providing information about the determined optimal performance configuration for the individual processor to a service manager, a means, within the service manager, for processing the information about the determined optimal performance configuration for the individual processor, and a means for setting an individual frequency of the individual processor using the information processed within the service manager.

DESCRIPTION OF THE DRAWINGS

The detailed description will refer to the following drawings, wherein like numerals refer to like elements, and wherein.

DETAILED DESCRIPTION

Figure 1:
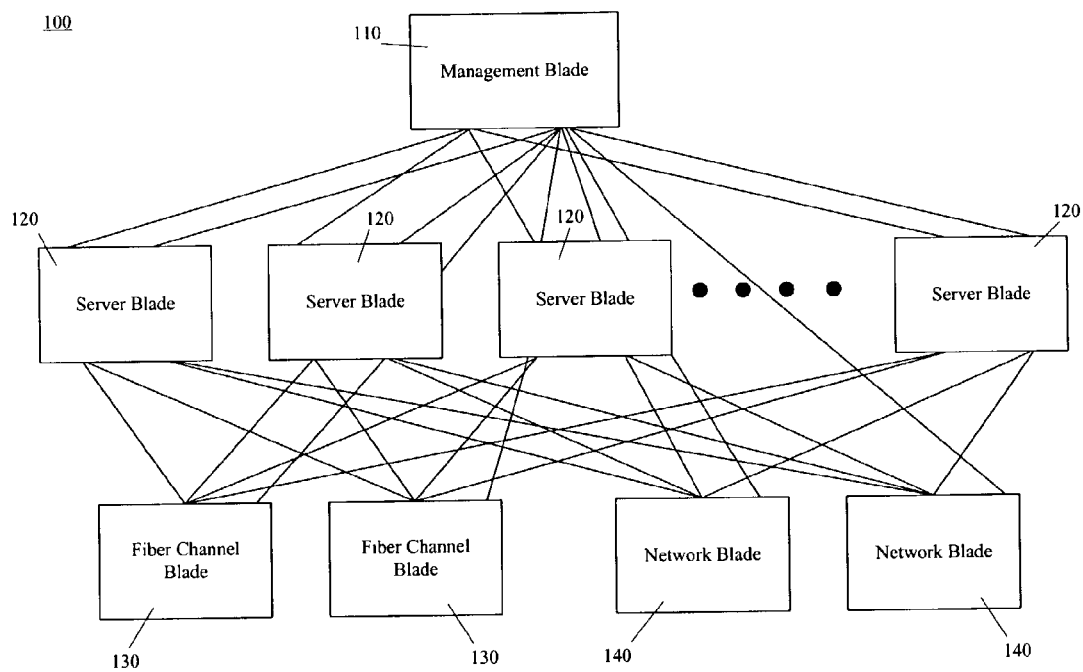
FIG. 1 shows a block diagram depicting one embodiment of the basic modular building blocks of a bladed architecture system.

Some preferred embodiments of devices and methods for managing the performance of bladed computer systems and for managing the operating frequency of blades in a bladed computer system will now be described in detail with reference to the following figures, in which like numerals refer to like elements. With reference to FIG. 1 of the Drawings, there is illustrated therein a block diagram depicting one embodiment of the basic modular building blocks of a bladed computer system architecture, as generally designated by the reference numeral 100. A management blade 110 (or, more generally, a management processor) supervises the functions of the chassis and provides a single interface to the consoles of all the server blades 120 (server processors) installed.

The management blade 110 can also detect the presence and/or identify one or more individual blades in the chassis. Although many method exist that allow the management blade 110 to detect and/or identify the individual blades, the serial presence detect (SPD) mechanism, which is known in the art, is often chosen. According to this mechanism, when a computer system is booted, the blades may be properly configured for maximum reliability and performance using information about that blades' size, data width, speed, and voltage. This information may be stored in an electrically erasable programmable read-only memory (EEPROM).

Implementation of the SPD mechanism may be through an I²C-based Intelligent Platform Management Bus (IPBM) interface. Such an interface generally provides a bi-directional communication link and a way to communicate with "intelligent" hardware that can monitor and control system health and performance. However, other ways of implementing the SPD mechanism will be apparent to one skilled in the art.

As shown in FIG. 1, server blades 120 (server processors) may be operably connected to and may be in communication with the management blade 110. The server blades 120 may, in turn, be operably connected to and may be in communication with other blades that perform specific functions. For example, as seen in FIG. 1, the server blades 120 may be in communication with fiber channel blades 130 (fiber channel processors) and network blades 140 (network processors).

It is to be appreciated that the various blades in a bladed architecture system may include server blades 120, fiber channel blades 130, network blades 140, storage blades or storage interconnect blades, etc. Once all of the blades in a chassis are identified, the management blade 110 automatically determines the optimal performance configuration for each of the individual blades or processors in the chassis. The determination of the optimal performance configuration is typically based on the currently available thermal and power envelopes that are known for the bladed server 100 in question. Information about the thermal and power envelopes may be stored within the management blade 110 or may be provided by an outside source.

Following the determination of the optimal performance configuration, information about the determined optimal performance configuration for each of the individual processors or blades may be provided to a Guardian Service Processor (GSP) service manager. The GSP may be built into a PA blade in the chassis and may then keep the information in RAM, communicate with the blades in the chassis, and/or manage serial ports, LAN ports, modem ports, etc. The information may be provided to the GSP through an I²C IPMB, a Local Area Network (LAN), etc.

Before communicating with the blades, the GSP may be used to process the information about the optimal performance configuration that was determined within the GSP according to the paragraph above. Though no specific type of processing is required, the information should be communicated to the processors, blades, or other components of the computer system in a format that allows for the processors, blades, or other components to be controlled.

More specifically, the individual frequency for one or more of the individual processors or blades within the chassis may be set using the information processed within the GSP. The setting of the frequencies for the individual processors or blades may be done using a number of devices such as, but not limited to, manual configuration devices (e.g., dip switches), resistor jumpers, microcontrollers/microprocessors, field-programmable gate arrays (FPGA), programmable logic devices (PLD), and/or I²C-based I/O-expander chips, as will be discussed below and shown in the attached Figures. One of ordinary skill in the are would recognize that there are many common manual configuration devices that are capable of performing the desired function (e.g., dip switches, jumpers installed over pin heads, rotational configuration switches, and solder bridges).

As discussed above, it is desirous to create a bladed architecture system in which it is possible to adjust the frequency of the blades individually based on the loading of those blades. FIGS. 2-6 illustrate various methods for manually managing the operating frequency of the various processors or blades in the system. In the embodiments illustrated in FIGS. 2-6, the processor core frequency of the CPU is asynchronous to the bus operating frequency. Therefore, a change to the processor core frequency can be made independently of the system bus frequency.

Currently, Hewlett Packard uses the SPHYR-T ASIC as the preferred frequency-synthesizer for generating the processor clock of the PA-RISC systems. However, one skilled in the art would readily recognize that other synthesizers may also be used. Generally, frequency synthesizer chips used to generate the processor's clocks have parallel or serialized configuration bits that allow one to choose the ratio of the input clock to the output clock (synthesized frequency). This allows one to run the processors at a different frequency upon reboot of the blade. The frequency synthesizer typically has an input frequency from a core crystal. Through controlling the serial or parallel pins it provides the output frequency ratio that is sent to the processors. One skilled in the art would also appreciate that if multiple frequency synthesizers are utilized, i.e., two (for a 2-way system) or N (for an N-way system), to generate the processor's clocks, the processors are able to operate at different frequencies within the range of frequencies supported by the processor. FIGS. 2-6 illustrate different methodologies of the how the ratio pins of the different frequency synthesizers can be controlled.

Figure 2:
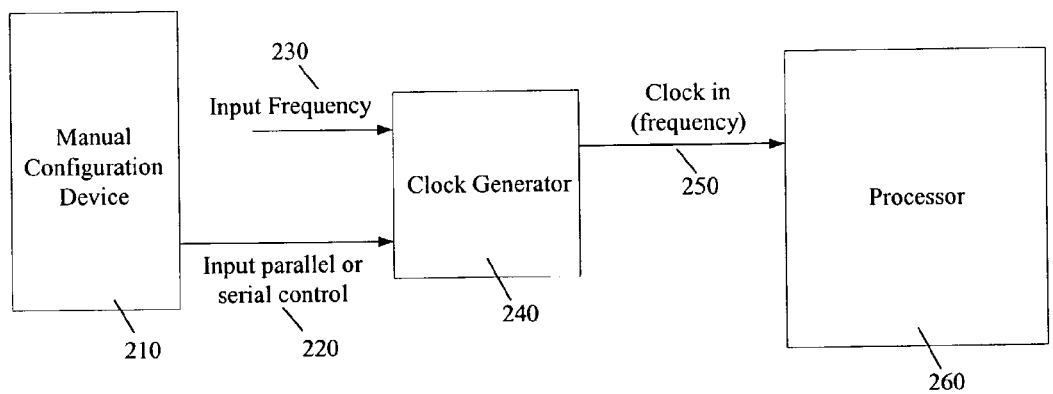
FIG. 2 illustrates a block diagram depicting one methodology of managing the operating frequency of individual blades by use of a manual configuration device.

With reference now to FIG. 2 of the Drawings, there is illustrated therein a block diagram, generally designated by the reference numeral 200, depicting one methodology of managing the operating frequency of individual blades by use of a manual configuration device (e.g., a dip switch) 210. As seen in FIG. 2, the manual configuration device 210 is added to a readily accessible part of the bladed computer system. Thus, the GSP may be used to set the frequency of the processors or blades upon reboot of the bladed computer system, based on the optimal performance configuration discussed above. The input frequency 230 and signal 220 from the manual configuration device 210 may be used to generate an output frequency 250 at the clock generator 240 that is used by a processor 260 or blade. It is to be appreciated that this method of changing the frequency of the processor 260 or blade by use of a manual configuration device (e.g., a dip switch) 210, and the other methods described herein below, may be applied to various types of bladed architectures.

Figure 3:
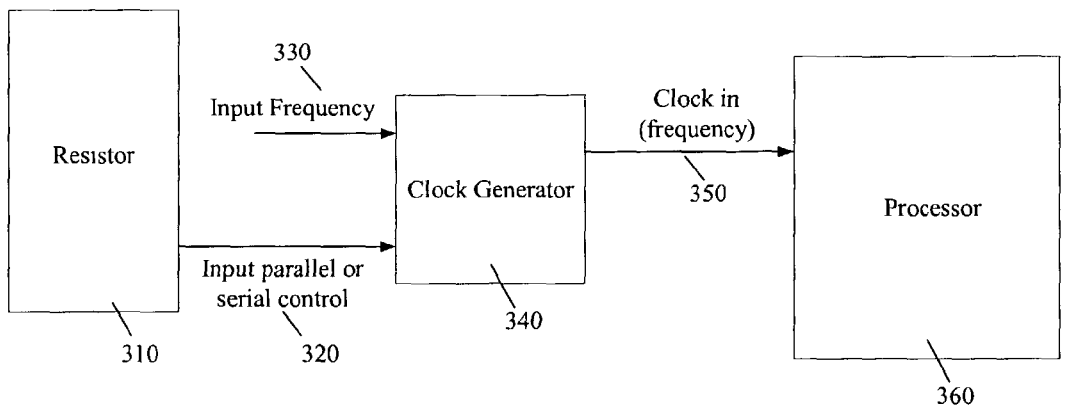
FIG. 3 illustrates a block diagram depicting another method of managing the operating frequency of individual blades by use of resistors.

With reference now to FIG. 3 of the Drawings, there is illustrated therein a block diagram 300 depicting another method of managing the operating frequency of individual blades. According to the method illustrated by block diagram 300, the operating frequency of individual blades may be managed by use of resistor jumpers 310. As seen in FIG. 3, the resistor jumpers 310 may be added to a readily accessible part of the computer system. Thus, the GSP may set the frequency of the processors or blades in the system upon reboot of the system, based on the optimal performance configuration discussed above. An input frequency 330 and signal 320 from the resistor jumpers 310 may be used to generate an output frequency 350 at a clock generator 340 that is used by a processor 360 or blade.

Figure 4:
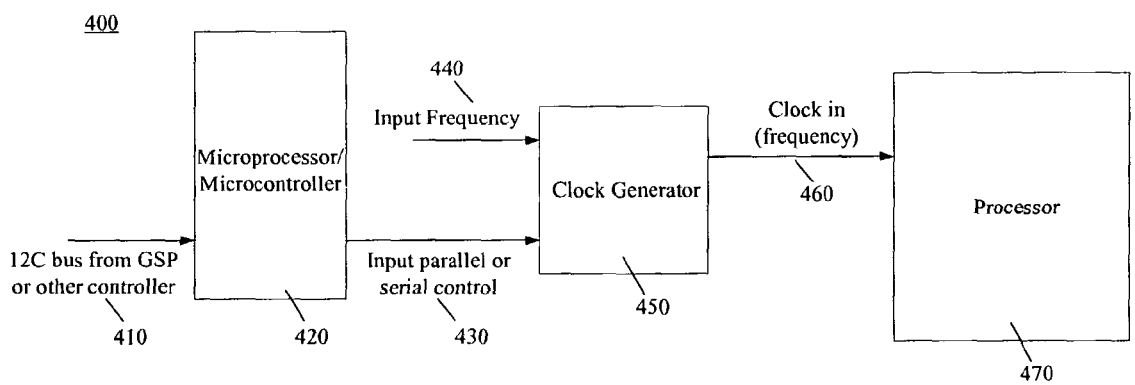
FIG. 4 illustrates a block diagram depicting another method of managing the operating frequency of individual blades by use of a microcontroller or microprocessor.

With reference now to FIG. 4 of the Drawings, there is illustrated therein a block diagram 400 depicting the method of managing the operating frequency of individual blades by use of a microcontroller or microprocessor 420. The microcontroller or microprocessor 420 may be used to interface with the GSP to ask for the specific frequency at which each blade, or processor, should operate or run. As seen in FIG. 4, the microcontroller or microprocessor 420 may receive a signal from a $I^2C$ bus 410 from the GSP (Guardian Service Processor) or other controller. The microcontroller or microprocessor 420 may then output a parallel or serial control 430, based upon the specific frequency designated by the GSP. A clock generator 450 may then use an input frequency and parallel or serial control signal 430 to generate an output frequency 460 used by a designated processor or blade 470. The use of the microcontroller or microprocessor 420 allows the GSP to control the frequency synthesizers in a more transparent way than the above-described register and manual configuration device methods, (i.e., it is not necessarily need to know how the settings of the configuration bits will affect the output).

Figure 5:
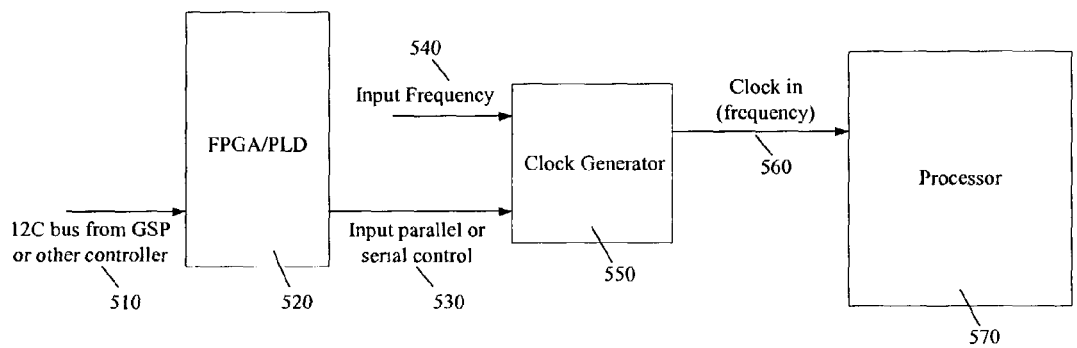
FIG. 5 illustrates a block diagram depicting another method of managing the operating frequency of individual blades by use of a FPGA or PLD.

With reference now to FIG. 5 of the Drawings, there is illustrated therein a block diagram 500 depicting the method of managing the operating frequency of individual blades by use of a FPGA or PLD 520. As is known to those skilled in the art, a FPGA is a chip that can be programmed in the field after manufacture. The FPGA or PLD 520 may be used to receive commands from a higher-level device, such as the GSP, via an $I^2C$ bus 510, and to control the configuration bits for the frequency synthesizer (or each synthesizer). As seen in FIG. 5, a clock generator 550, may use an input frequency 540 and the control from the FPGA/PLD 520 to generate an output frequency 560 used by a processor or blade 570. Like the use of the microcontroller/microprocessor 420 described in FIG. 4, the FPGA/PLD 520 allows the GSP to control the frequency synthesizers in a more transparent way (i.e., it is not necessarily to know how the settings of the configuration bits will affect the output).

Figure 6:
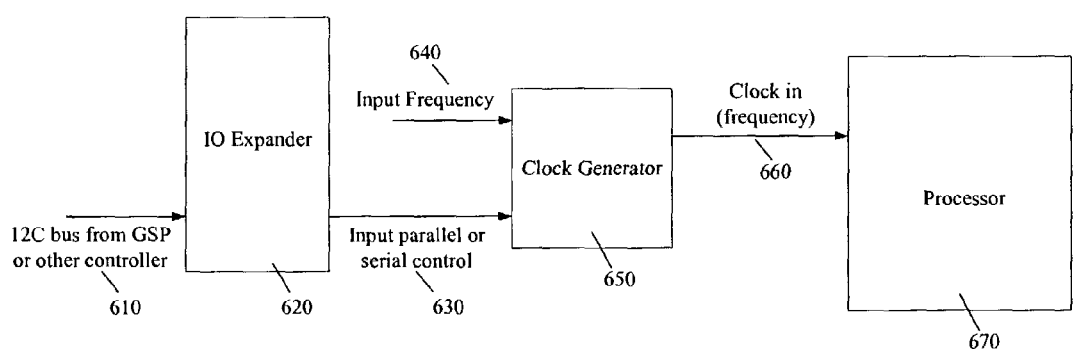
FIG. 6 illustrates a block diagram depicting another method of managing the operating frequency of individual blades by use of an I/O-Expander chip (I/OX)

With reference now to FIG. 6 of the Drawings, there is illustrated therein a block diagram 600 depicting the method of managing the operating frequency of individual blades by use of an $I^2C$-based I/O-expander chip (I/OX) 620. An $I^2C$-based I/OX 620 is an inexpensive and simple solution that can be used to transparently control each frequency synthesizer. I/OX chips 620 have I/O ports, which can be forced to a particular state by writing to the I/OX through an $I^2C$ command. Since I/OX typically have multiple I/O ports, one I/OX can be used to control multiple frequency synthesizers individually.

Since I/OX chips are $I^2C$-based, they can be controlled by any device that supports an $I^2C$ interface. In Hewlett Packard's PA-RISC Blades, such a logical device could be the service processor, or GSP, of the PA Blade. The user-friendly interface of the GSP may be used to transparently allow the customer to manually control the frequency of the processors without need of any low-level information (e.g., bit-settings). The input from the GSP is designated in FIG. 6 by reference numeral 610. The user at the GSP inputs commands to increase the frequency of the processor. The GSP then delivers the required bits to change the ratio of the frequency generator, so that the processor will run at the desired level. The bit stream 610 is received by the I/OX 620. A clock generator 650 then uses an input frequency 640 and a control signal 630 to generate an output frequency 660 used by a processor or blade 670.

Turning the discussion away from the specific devices that may be used to set the frequencies of the individual blades or processors and returning to the general method for managing the performance of a bladed computer system, it is possible to allow for the setting of individual frequencies for one or more of the individual blades or processors in the chassis to be disabled. In other words, a system user may choose to prevent the GSP from being able to change the frequency of one or more of the blades in the chassis.

In order to disable the setting of the individual frequency for at least one of the blades, a flag may be provided in the GSP Non-Volatile Random Access Memory (NVRAM). A backup of the flag may also be provided in a Platform (or Processor) Dependent Hardware (PDH) register. The flag, or the backup of the flag, may be used to enable and/or disable setting of the individual frequency for at least one of the individual blades. According to certain embodiments, the flag may be used to enable/disable setting of the individual frequency for several or even all of the blades in the system.

Another alternative for enabling and disabling the setting of the individual frequency for at least one of the individual blades or processors in the chassis includes providing a flag at the management blade. When a flag is at the management blade, the flag may be set for those blades or processors that the user does not wish to have reconfigured. Under such circumstances, the blades may be treated as constants during the power and thermal calculations discussed above if the setting of the individual frequency has been disabled using the flag.

Figure 7:
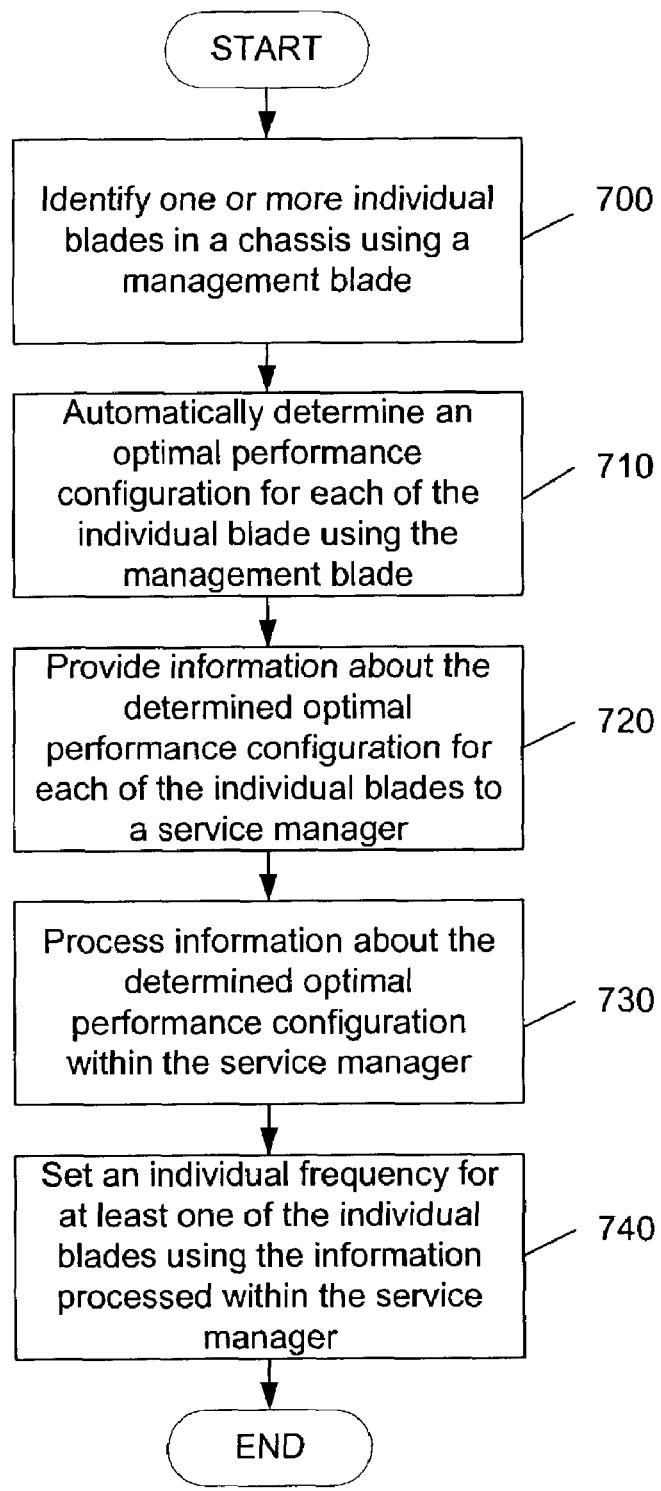
FIG. 7 illustrates a flowchart containing the steps of a method for managing the performance of a bladed computer system.

With reference now to FIG. 7, a flowchart containing the steps of a method for managing the performance of a bladed computer system is illustrated therein. The method includes step 700, which specifies that one or more individual blades in a chassis be identified using a management blade. Step 710 then specifies that an optimal performance configuration for each of the individual blade be automatically determined using the management blade. Step 720 follows and specifies that information about the determined optimal performance configuration for each of the individual blades be provided to a service manager. Step 730 next specifies that the information about the determined optimal performance configuration be processed within the service manager. Finally, step 740 specifies that an individual frequency for at least one of the individual blades be set using the information processed within the service manager. All of the steps in FIG. 7 may be implemented and/or modified in any of the manners discussed above and/or in any manner that would be known to one skilled in the art.

It is to be appreciated that the principles disclosed herein may be applied to a system comprised of processors or blades that share a common chassis or to an architecture system that spans multiple chassis. That is, the principles may be applied to systems that are divided by either a physical or logical partition. For example, physically, a system may include 3 chassis, with each chassis having 8 processors. Logically, the same system could be partitioned into 5 different web servers for 5 different customers. Power constraints within a chassis typically concern the physical partition of the system. Power constraints imposed on a customer or application that is located in multiple chassis, typically concern logical partitions. One of ordinary skill in the art would readily recognize that the innovations described above may be applied to both physically and logically partitioned architectures.

While devices and methods for managing the performance of a bladed computer system have been described in connection with exemplary embodiments, those skilled in the art will understand that many modifications in light of these teaching are possible, and this application is intended to cover any variation thereof.

For example, the disclosed devices and methods makes use of specific frequency synthesizers that are used to manipulate the frequency of various components Other frequency synthesizers could likewise be used. Thus, frequency synthesizers are shown and referenced generally throughout this disclosure, and unless specifically noted, are intended to represent any and all devices/technologies appropriate to perform the desired function. Likewise, there are disclosed several processors architecture types. The specific architecture type is not important to the methods and/or devices described herein. One of ordinary skill in the art would realize that the principles described herein may be applied to DEC Alpha, MIPS, PowerPC, SPARC, IA-32, and IA-64 architectures, etc. Thus, it is not applicants' intention to limit the methods and/or devices described herein to any particular form of architecture.

Further examples exist throughout the disclosure, and it is not applicants' intention to exclude from the scope of the methods and/or devices described herein the use of structures, materials, or acts that are not expressly identified in the specification, but nonetheless are capable of performing a claimed function.

The invention claimed is:

1. A method for managing the performance of a bladed computer system, the method comprising:
   identifying, using a management blade, one or more individual blades in a chassis;
   automatically determining, using the management blade, an optimal performance configuration for each of the individual blades, wherein the automatically determining comprises basing the determination on currently available thermal and power envelopes;
   providing information about the determined optimal performance configuration for each of the individual blades to a service manager;
   processing the information about the determined optimal performance configuration within the service manager;
   setting an individual operating frequency for at least one of the individual blades using the information processed within the service manager, wherein the individual operating frequency for the at least one individual blade may be different than an individual operating frequency for another one of the individual blades; and
   allowing for the setting of the individual operating frequency for the at least one of the individual blades to be disabled without disabling the at least one individual blade;
   wherein the allowing step comprises providing a flag at the management blade that may enable and disable setting of the individual operating frequency for at least one of the individual blades.

2. The method of claim 1, wherein the identifying step comprises using a serial presence detect mechanism.

3. The method of claim 1, wherein the identifying step comprises using an I2C-based Intelligent Platform Management Bus (IPMB) interface.

4. The method of claim 1, wherein the providing step comprises using a Guardian Service Processor (GSP) as the service manager.

5. The method of claim 1, wherein the providing step comprises building the service manager into a PA blade.

6. The method of claim 5, wherein the providing step further comprises using an I2C IPMB.

7. The method of claim 5, wherein the providing step further comprises using a local area network (LAN).

8. The method of claim 1, wherein the setting step comprises using a manual configuration device.

9. The method of claim 1, wherein the setting step comprises using resistor jumpers.

10. The method of claim 1, wherein the setting step comprises using a microcontroller.

11. The method of claim 1, wherein the setting step comprises using a field-programmable gate array (FPGA).

12. The method of claim 1, wherein the setting step comprises using a programmable logic device (PLD).

13. The method of claim 1, wherein the setting step comprises using an I2C-based I/O-expander chip.

14. The method of claim 1, wherein the allowing step comprises providing a flag in the service manager Non-Volatile Random Access Memory (NVRAM) and wherein the flag enables and disables setting of the individual operating frequency for at least one of the individual blades.

15. The method of claim 14, wherein the allowing step further comprises providing a backup copy of the flag in a Platform Dependent Hardware (PDH) register.

16. The method of claim 1, further comprising treating blades as constants during power and thermal calculations performed for each blade when setting of the individual operating frequency has been disabled using the flag.

17. A computer system, comprising:

a set of processors housed within a chassis;

means for identifying an individual processor in the set of processors in the chassis;

means for automatically determining an optimal performance configuration for the individual processor, wherein the automatically determining means bases the determination on currently available thermal and power envelopes;

means for providing information about the determined optimal performance configuration for the individual processor to a service manager;

means, within the service manager, for processing the information about the determined optimal performance configuration for the individual processor;

means for setting an individual operating frequency of the individual processor using the information processed within the service manager, wherein the individual operating frequency for the at least one individual blade may be different than an individual operating frequency for another one of the individual blades; and means for allowing the setting of the individual operating frequency for at least one of the individual blades to be disabled without disabling the at least one individual blade;

wherein the means for allowing comprises providing a flag at a management blade that may enable and disable setting of the individual operating frequency for at least one of the individual blades.

18. The system of claim 17, wherein the means for setting an individual operating frequency of the individual processor comprises at least one of a manual configuration device, resistor jumpers, a microcontroller, a field-programmable gate array (FPGA), a programmable logic device (PLD), and an I2C-based FO-expander chip.

19. The system of claim 17, wherein the service manager comprises a Guardian Service Processor (GSP).

* * * * *